Oct. 11, 1966   D. P. SOEGAARD   3,278,035

STRAINER DEVICE FOR SEWAGE SYSTEM

Filed Sept. 18, 1963

INVENTOR.
DONALD P. SOEGAARD
BY
ATTORNEY

3,278,035
STRAINER DEVICE FOR SEWAGE SYSTEM
Donald P. Soegaard, Castro Valley, Calif., assignor to Pacific Pumping Company, Oakland, Calif., a corporation of California
Filed Sept. 18, 1963, Ser. No. 309,670
7 Claims. (Cl. 210—315)

This invention relates to an improved strainer device particularly adaptable for use in wet or dry well sewage pumping systems.

In sewage systems of the wet or dry well type, the incoming sewage flows into a storage container through a conduit, and after a period of time the liquid is pumped out through part of the same conduit. The pumping of the liquid commences when it rises to a predetermined level in the container. A check valve is utilized to close the conduit at one point and divert the outflowing liquid through a discharge outlet. The inflowing sewage always contains a certain percentage of non-soluble type solids such as pieces of paper and rags which must be kept from the storage container. It has for some time been the intended practice to use a strainer device in the conduit for intercepting these solids during the inflow cycle and then to attempt to flush these solids out when the flow is reversed through part of the common conduit to the system discharge. However, in actual installations heretofore provided the system often failed to function properly because the strainer device could not be effectively and completely purged during the outflow cycle. In most system installations the pump head available for the liquid outflow is limited, and thus the problem prior to the present invention was to provide a strainer device capable of utilizing this available pump head to the fullest extent to achieve an effective purging action. Without an adequate purging or flushing action during the outflow cycle, the ultimate result was a continuous clogging and often a complete breakdown of the entire sewage processing system.

It is therefore a general object of the invention to provide a strainer device for wet or dry well sewage systems that is more easily and effectively flushed to remove solids accumulated during the sewage inflow and which therefore enables the entire sewage system to provide increased reliability and trouble free service.

Another object of my invention is to provide a strainer device that concentrates the force of the reverse flow of liquid produced by the limited pump head available within the conduit and which thereby enables all of the solids to be removed from the strainer device and discharged therefrom even though an unusually large amount may have accumulated during the inflow cycle. In accordance with the principles of my invention, a nozzle-like member having a tapered inwardly converging bore is provided at one end of the main strainer conduit which controls the flow of the liquid during the outflow cycle. The small end of the nozzle member is located adjacent a foraminous member extending within the strainer conduit. The foraminous member is surrounded by an internal-cylindrical conduit member connected at one end with the main conduit member and having a limited number of apertures located at its opposite ends. During the outflow cycle the nozzle member produces a jet-like stream of outflowing liquid directly through the foraminous member which provides a concentrated and highly effective purging force. Although a number of apertures are provided in the nozzle wall to facilitate bypassing of the foraminous strainer member by the sewage during the inflow cycle, the size and location of these apertures is such that the force of the liquid through the nozzle during the outflow cycle is not diminished appreciably.

Still another object of the invention is to provide a strainer device for wet or dry well sewage systems wherein an adequate flow of strained liquid can be maintained through the system by bypassing the accumulated solids around the internal cylindrical conduit member and the nozzle walls even though a substantial amount of solids have collected around the foraminous strainer member.

A further object of the invention is to provide an improved strainer device for wet and dry well sewage systems that is particularly well adapted for ease and economy of manufacture.

Other objects, advantages and features of my invention will become apparent from the following detailed description of one embodiment thereof presented in accordance with 35 USC 112.

Figure 1:
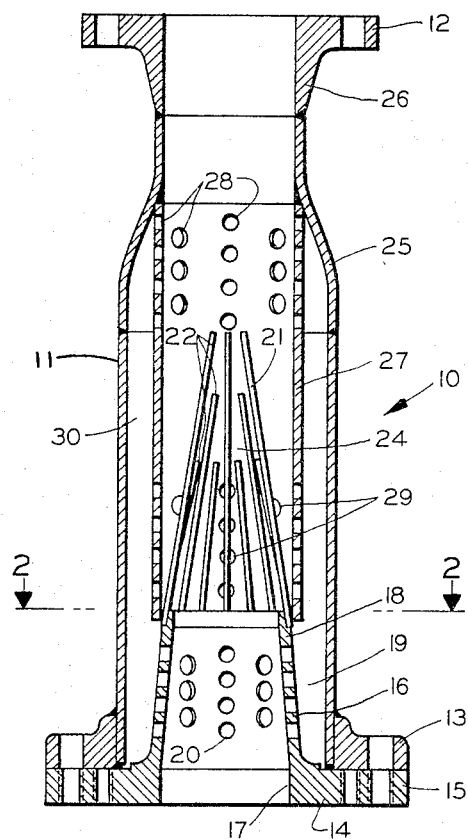
FIG. 1 is a view in elevation and in section showing the strainer device embodying the principles of the invention.

In the drawings, FIG. 1 shows a strainer 10 embodying the principles of the invention which comprises a conduit section 11 having an outwardly extending flange 12 at its upper end and a second outwardly extending flange 13 at its lower end. The two flanges 12 and 13 enable the conduit section to be readily connected with other conduit sections in a sewage system. Extending axially upward and into the lower end of the conduit section 11 is a nozzle member 14 having an outwardly extending flange 15 which is adjacent to and adapted to fit flush against the second flange 13 of the conduit section 11. The nozzle member 14 has a central tubular portion 16 with an opening 17 having a diameter that is somewhat smaller than the inside diameter of the conduit section 11 at its lower end. The bore of the tubular nozzle portion 16 tapers inwardly from its opening 17 at a constant rate to an even smaller diameter at its inner end 18 located within the conduit section 11. Thus, with the flanges 13 and 15 engaged, an annular space 19 is formed within the conduit section 11 around the converging tapered nozzle portion 16. Spaced apart circumferentially and axially on the tapered nozzle portion 16 is a plurality of apertures 20 through which liquid can flow between the nozzle bore and the annular space 19 around it.

Figure 2:
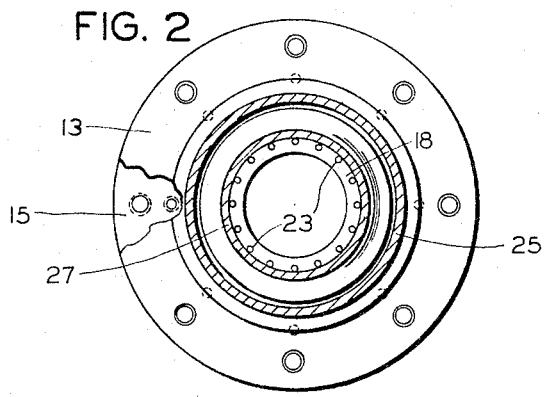
FIG. 2 is a view in cross section taken along line 2—2 of FIG. 1.

Attached to the upper end 18 of the nozzle member 14 within the conduit section 11 is a foraminated cone section 21 formed by a group of spaced apart rods 22. As shown in FIG. 2, the rods 22 are preferably fitted into slots 23 formed in the end 18 of the tapered nozzle section 16 and they are secured thereto by bonding or brazing in the well known manner. The rods 22 are provided in groups of different lengths, as seen in FIG. 1, the rods in each group being spaced apart around the upper edge of the nozzle member 14 and converging toward the axial centerline of the conduit section 11. Thus, with the aforesaid arrangement a series of longitudinally extending spaces 24 of substantially equal width are formed along the length of the conical section 21.

At its upper end the conduit section 11 has a portion 25 that tapers or necks down to a smaller diameter and is connected to an end portion 26 having the flange 12. Attached to the inner wall of the portion 25 is an internal cylindrical member 27 having an inside diameter substantially equal to the smallest inside diameter of the portion 25 and which extends downward over the conical section 21 and overlaps slightly the upper end 18 of the nozzle member 16. Near the upper end of the cylindrical member is a first series of apertures 28 and near its lower end is another series of apertures 29, all of said apertures communicating with an annular chamber 30 that is formed between the cylindrical member 27 and the outer conduit 11, the chamber 30 thus being a continuation of and in communication with the annular chamber 19 around the nozzle member 14.

In constructing my strainer device 10 according to the invention, standard metal materials and fabrication methods may be utilized. As shown in FIG. 1, the central portion of the conduit section 11, the tapered or necked down portion 25, and the upper and lower flange portions 12 and 13 may be fabricated separately and then welded together. The central cylindrical member 27 with its upper and lower series of apertures 28 and 29, respectively, may also be attached to the inside wall of the tapered conduit portion 25 in the same manner. As previously described, the nozzle 14, with its integral flange 15 and tapered portion 16, are connected to the conical section 21 formed by the rods 22. When the flanges 13 and 15 of the conduit section 11 and the nozzle 14 are engaged, the conical section 21 extends up within the inside cylindrical member 27 so that the latter's lower end just slightly overlaps the upper end of the tapered nozzle portion 16.

When in operation in a standard wet well type sewage system, the inflow of liquid to be strained is through the upper end of the conduit section 11, as viewed in FIG. 1. The liquid flow continues primarily through the inside cylindrical member 27 through the spaces 24 between the rods 22 of the conical section 21 and through the nozzle member 14. The solids carried into the conduit 11 by the inflowing liquid are prevented from flowing through the nozzle 14 by the rods 22 and these solids continue to accumulate around the conical section 21 within the central cylindrical member 27. When the normal rate of flow through the cylindrical member 27 has been decreased due to the solids collected around the conical section 21, a reduced amount of flow can be maintained through the apertures 29 and into the annular chambers 30 and 19 and then through the apertures 20 into the nozzle member 16, thereby bypassing the collected solids. The inflow cycle is normally regulated so that the solids will not accumulate to a level above the conical section 21. As soon as the inflow cycle terminates, the pump of the system reverses the flow of liquid and forces it back through the conduit 11 and out through a discharge outlet.

It is extremely important that when the pump is reversed to flush the strainer device 10 that sufficient force be available to completely remove the accumulated solids around the foraminous strainer member. In the present invention the nozzle member 14, because of its inwardly convergent bore produces a jet-like effect on the liquid forced therethrough so that this liquid increases in velocity just as it passes through the foraminous conical section 21. The apertures 20 in the tapered wall of the nozzle 14 are relatively small compared with the spaces between the rods 22 and thus they do not significantly diminsh the axially directed force of the liquid passing through the nozzle. Moreover, the liquid that is forced through the apertures 20 is also forced back through the apertures 28 and 29 into the main stream of the cylindrical member 27, thereby clearing these apertures and further aiding the flushing action.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. In combination with:
  a first cylindrical conduit member having a necked down portion at one end;
  a second cylindrical conduit member having the same diameter as the necked down portion of said first cylindrical conduit member and attached thereto at one end within said first cylindrical conduit member;
  a tapered nozzle member extending within the end of said first cylindrical member at the end of said first conduit member opposite its necked down portion and engaging an end of said second cylindrical member;
  said second cylindrical member and said nozzle member having spaced apart apertures;
  and a generally conical shaped foraminous member, the openings therein formed by spaces, fixed to the end of said nozzle member and extending generally axially within said second cylindrical member,
  the apertures in the nozzle member being small compared with the spaces of the foraminous member.

2. In combination with:
  a first cylindrical conduit member;
  a second cylindrical conduit member having a smaller diameter than said first cylindrical conduit member;
  means connecting said first and second conduit members at one end;
  a nozzle member having a radial flange and an axial body portion with a tapered bore extending within the end of said first cylindrical member at the opposite end of said first conduit member and engaging said second cylindrical member;
  said second cylindrical conduit member and said nozzle member having spaced apart apertures;
  and a generally conical shaped foraminous member fixed to the end of said nozzle member, the openings therein formed by spaces and extending within said second cylindrical member,
  the apertures in the nozzle member being small compared with the spaces of the foraminous member.

3. The combination of claim 2 wherein said foraminous member comprises a series of bars fixed to the inner end of said nozzle member at circumferentially spaced apart locations and converging upwardly within said second conduit member.

4. The combination of claim 2 wherein the apertures in said second cylindrical conduit are spaced apart in separate groups near its upper and lower ends.

5. In combination with:
  a first cylindrical conduit member having a necked down portion at one end and radial flanges at its upper and lower ends;
  a second cylindrical conduit member having the same diameter as the necked down portion of said first cylindrical conduit member and attached thereto at one end within said first cylindrical conduit member;
  a nozzle member having a tubular portion with an inwardly converging bore extending within the end of said first cylindrical member at the end opposite its necked down portion, the inner end of said tubular portion engaging the lower end of said second cylindrical member, and a radial flange integral with said tubular portion of said nozzle member adjacent the flange of said first conduit member at its lower end;
  said second cylindrical member and said nozzle member having spaced apart apertures;
  and a generally conical shaped foraminous member, the openings therein formed by spaces, fixed to the end of said nozzle member and extending within said second cylindrical member,
  the apertures in the nozzle member being small compared with the spaces of the foraminous member.

6. In combination with:
  a first conduit member;
  a second conduit member having a smaller diameter than said first conduit member;
  means connecting said first and second conduit members at their upper ends;
  a nozzle member having a flange and a tubular body portion with an upwardly convergent bore extending within the end of said first conduit member at its lower end and engaging said second conduit member; said second conduit member and said nozzle member having spaced apart apertures;

and a generally conical shaped member of spaced part rods fixed to the end of said nozzle member and extending within said second cylindrical member, the apertures in the nozzle member being small compared with the spaces between the rods.

7. In combination with a conduit for a sewage flow system, a strainer device comprising:

a flange member fixed to one end of said conduit and having an inwardly axial extending tapered nozzle portion, said nozzle portion having a series of spaced apart openings;

a series of inwardly converging spaced apart rods fixed to said tapered nozzle portion near its inner end;

the opening in the nozzle portion being small compared with the spaces between the rods;

an inner wall member fixed at one end to and extending axially from the end of said tapered nozzle portion and fixed at its other end to the inside of said conduit near its other end, said wall member having a series of perforations near both ends near the inlet of said conduit and around said tapered nozzle portion;

whereby the intercepted solids are retained by said inner wall member, the liquid flowing through said conduit and through the annular chamber bypassing the intercepted solids during the inflow cycle, and whereby the tapered nozzle portion provides an increased flow force through the inner wall member for removing the intercepted solids during the outflow cycle of the system.

References Cited by the Examiner

UNITED STATES PATENTS

| | | | |
|---|---|---|---|
| 284,428 | 9/1883 | James | 210—448 |
| 2,278,178 | 3/1942 | Lannert | 210—448 |
| 3,074,557 | 1/1963 | Hanley | 210—299 |
| 3,074,558 | 1/1963 | Huntowski | 210—299 |

REUBEN FRIEDMAN, *Primary Examiner.*

SAMAH ZAHARNA, *Examiner.*

F. A. SPEAR, *Assistant Examiner.*

UNITED STATES PATENT OFFICE
CERTIFICATE OF CORRECTION

Patent No. 3,278,035                     October 11, 1966

Donald P. Soegaard

It is hereby certified that error appears in the above numbered patent requiring correction and that the said Letters Patent should read as corrected below.

Column 2, line 41, for "converging" read -- convergently --; column 3, line 55, for "diminsh" read -- diminish --; column 4, line 28, after "member" insert --, the openings therein formed by spaces --; lines 29 and 30, after "member" strike out "the openings therein formed by spaces" --.

Signed and sealed this 29th day of August 1967.

(SEAL)
Attest:

ERNEST W. SWIDER                        EDWARD J. BRENNER
Attesting Officer                     Commissioner of Patents